(12) United States Patent
Ellis

(10) Patent No.: US 8,960,700 B2
(45) Date of Patent: Feb. 24, 2015

(54) BICYCLE REPAIR TOOLS AND KIT

(71) Applicant: David Ellis, Milford, CT (US)

(72) Inventor: David Ellis, Milford, CT (US)

( * ) Notice: Subject to any disclaimer, the term of this patent is extended or adjusted under 35 U.S.C. 154(b) by 95 days.

(21) Appl. No.: 13/777,541

(22) Filed: Feb. 26, 2013

(65) Prior Publication Data

US 2014/0238200 A1    Aug. 28, 2014

(51) Int. Cl.
*B60C 25/02* (2006.01)

(52) U.S. Cl.
CPC ..................... *B60C 25/02* (2013.01)
USPC ........................................ 280/276

(58) Field of Classification Search
CPC ........ B60C 23/10; B60C 23/16; B60C 25/02; B60C 25/0509; B62J 11/00; B62J 11/99
USPC ........................ 81/15.2, 15.3; 280/276, 288.4
See application file for complete search history.

(56) References Cited

U.S. PATENT DOCUMENTS

| | | | |
|---|---|---|---|
| 589,402 | A | 9/1897 | Badgley |
| 4,079,872 | A | 3/1978 | Halter |
| 5,217,116 | A | 6/1993 | Ku |
| 5,669,492 | A | 9/1997 | Chao |
| 7,654,550 | B2 | 2/2010 | Chuang |
| 8,066,296 | B2 | 11/2011 | White |
| 2014/0109728 | A1* | 4/2014 | McRorie, III .................. 81/15.2 |

* cited by examiner

*Primary Examiner* — Joseph Rocca
*Assistant Examiner* — Felicia L Brittman
(74) *Attorney, Agent, or Firm* — Michael A. Blake

(57) ABSTRACT

A pair of bicycle tire levers comprising: an outside lever, the outside lever having a main body and a tapered end on one end of the main body, the outside lever comprising: an unthreaded compressed gas cartridge clearance hole located on the main body, and an inside lever, the inside lever having a main body and a tapered end on one end of the main body; the inside lever comprising: a threaded compressed gas cartridge hole located on the main body and configured to allow a compressed gas cartridge to screw into the hole. A compressed gas accessory holder comprising: a main orifice body; a threaded main orifice located in the main orifice body, where the threaded main orifice is configured to allow a compressed gas cartridge to screw into the main orifice; a slotted body attached to the main orifice body, the slotted body comprising: a main slot.

13 Claims, 8 Drawing Sheets

1

BICYCLE REPAIR TOOLS AND KIT

TECHNICAL FIELD

The invention relates to bicycle repair tools and kit, and, more particularly, to a bicycle repair tools and kit that are lightweight and easy to install and remove.

BACKGROUND

Currently, cyclists generally carry bicycle repair tools in a bag attached to the bicycle, usually under the seat. Some riders will use the pockets in their clothing or backpacks they wear while riding for storage of the bicycle repair tools. Some cyclists forgo carrying these tools, and risk being stranded roadside.

Known bicycle repair tools have a large number of parts which can lost, are relatively heavy, have poor aerodynamic characteristics.

Thus there is a need for a bicycle repair kit that overcomes the above listed and other disadvantages.

SUMMARY OF THE INVENTION

The disclosed invention relates to a pair of bicycle tire levers, the pair of bicycle tire levers comprising: an outside lever, the outside lever having a main body and a tapered end on one end of the main body, the outside lever comprising: an unthreaded compressed gas cartridge clearance hole located on the main body, and an inside lever, the inside lever having a main body and a tapered end on one end of the main body; the inside lever comprising: a threaded compressed gas cartridge hole located on the main body and configured to allow a compressed gas cartridge to screw into the hole.

The invention also relates to a compressed gas accessory holder, the compressed gas accessory holder comprising: a main orifice body; a threaded main orifice located in the main orifice body, where the threaded main orifice is configured to allow a compressed gas cartridge to screw into the main orifice; a slotted body attached to the main orifice body, the slotted body comprising: a main slot; a first screw hole located on the slotted body; a second screw hole located on the slotted body in collinear with the first screw hole; and where an imaginary line that goes though generally the center of the main slot is parallel to an imaginary line that goes through the center of the main orifice, and where an imaginary line that goes through the center first screw hole and the center of the second screw hole is generally offset and perpendicular to the imaginary line through the center of the orifice.

In addition, the disclosed invention relates to a bicycle tire repair kit comprising: pair of bicycle tire levers, the pair of bicycle tire levers comprising: an outside lever, the outside lever having a main body and a tapered end on one end of the main body, the outside lever comprising: an unthreaded compressed gas cartridge clearance hole located on the main body, an inside lever, the inside lever having a main body and a tapered end on one end of the main body; the inside lever comprising: a threaded compressed gas cartridge hole located on the main body and configured to allow a compressed gas cartridge to screw into the hole; a compressed gas accessory holder, the compressed gas accessory holder comprising: a main orifice body; a threaded main orifice located in the main orifice body, where the threaded main orifice is configured to allow a compressed gas cartridge to screw into the main orifice; a slotted body attached to the main orifice body, the slotted body comprising: a main slot; a first screw hole located on the slotted body; a second screw hole located on the slotted body in collinear with the first screw hole; and where an imaginary line that goes though generally the center of the main slot is parallel to an imaginary line that goes through the center of the main orifice, and where an imaginary line that goes through the center first screw hole and the center of the second screw hole is generally offset and perpendicular to the imaginary line through the center of the orifice.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
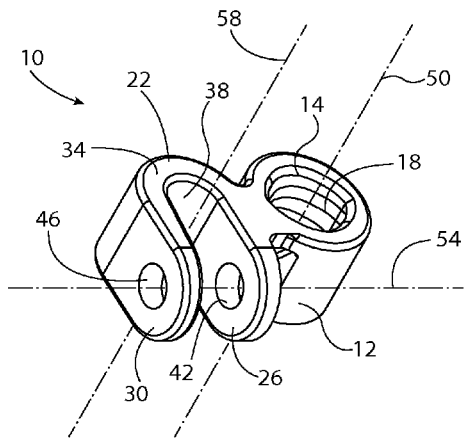
FIG. 1 is a perspective view of a compressed gas accessory holder.

FIG. 1 is a perspective view of a compressed gas accessory holder 10. The compressed gas accessory holder comprises an orifice body 12, the orifice body 12 contains a main orifice 14. The orifice body 12 may be generally cylindrical in shape and the orifice 14 may be generally circular. The inner surface 18 of the orifice 14 is threaded such that a compressed gas cartridge, as are used to quickly inflate a bicycle tire, will screw onto the orifice. Compressed gas cartridges include CO2 cartridges, but a person of ordinary skill will recognized that any suitable compressed gas cartridge is within the scope of the described invention. Attached to the orifice body 12 is a slotted body 22. The slotted body 22 comprises a first member 26, and a second member 30, and a curved member 34 that connects the first member 26 and second member 30. The first, second, and curved members 26, 30, 34 form a main slot 38. The first member 26 has a first screw hole 42 on a distal end, and the second member 30 has a second screw hole 46 located on a distal end. The screw holes 42, 46 are generally collinear. An imaginary line 50 through the center of the orifice 14 is generally offset and perpendicular to an imaginary 54 line through the center of both screw holes 42, 46. An imaginary line 58 through the center of slot is generally parallel to the line 50. In another embodiment, the first screw hole 42 may be threaded.

Figure 2:
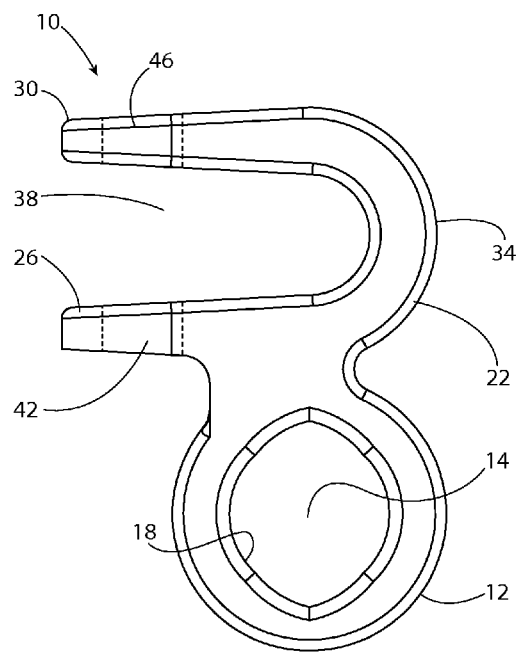
FIG. 2 is a side view of the compressed gas accessory holder from FIG. 1.
Figure 3:
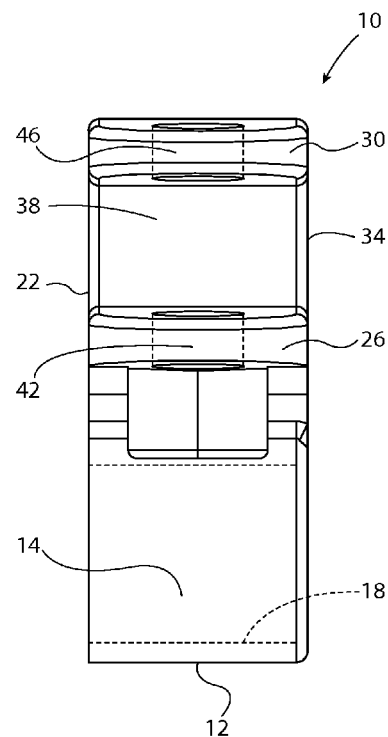
FIG. 3 is a front view of the compressed gas accessory holder from FIG. 1.

FIG. 2 is a side view of the compressed gas accessory holder 10 from FIG. 1. FIG. 3 is a front view of the compressed gas accessory holder 10.

Figure 4:
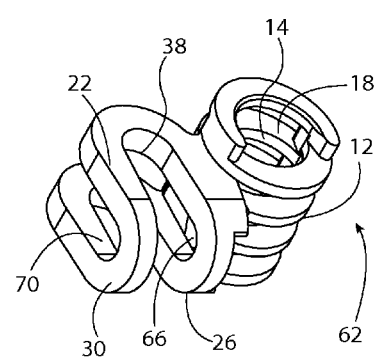
FIG. 4 is a perspective view of another embodiment of the compressed gas accessory holder.

FIG. 4 is another embodiment of a compressed gas accessory holder 62. In this embodiment, the compressed gas accessory holder is manufactured using a mold which reduces the amount of material in the compressed gas accessory holder 62 and reduces the weight of the compressed gas accessory holder 62. In this embodiment the orifice body 12 comprises a generally spiral shaped structure. The inner surface 18 of the orifice 14 is threaded to hold compressed gas cartridge. The slotted body 22 comprises a shape that generally is an oblong ring folded in half, where a first half of the oblong ring forms the first member 26 and the second half of the oblong ring forms the second member 30. Instead of screw holes 42, 46, there is a first screw slot 66, and second screw slot 70.

Figure 5:
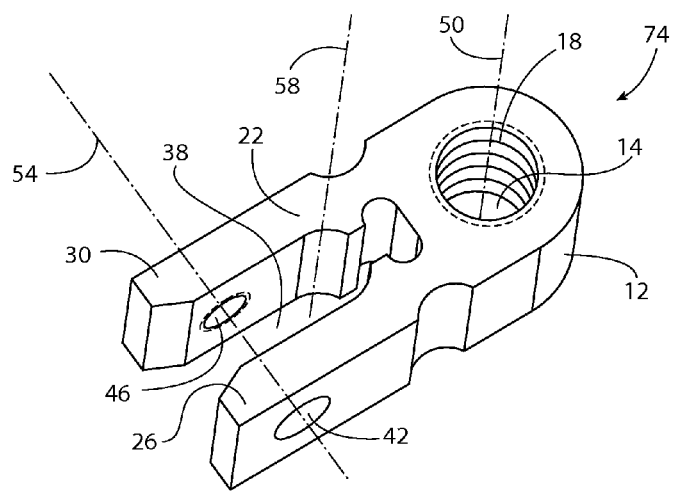
FIG. 5 is a perspective view of still another embodiment of the compressed gas accessory holder.

FIG. 5 is another embodiment of the compressed gas accessory holder 74. This compressed gas accessory holder 74 may be made out of aluminum or any other suitable material. The inner surface 18 of the orifice 14 is threaded to hold a compressed gas cartridge. In this embodiment, the both the first member 26 and second member are directly attached to the orifice body 12.

Figure 6:
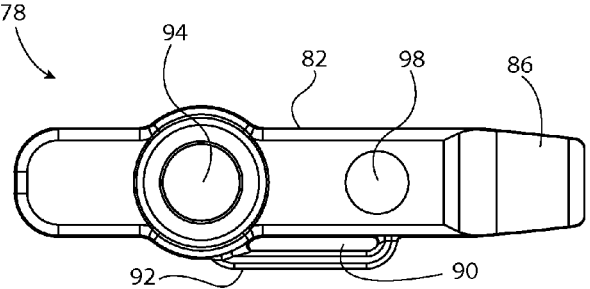
FIG. 6 is a top view of an outside bicycle tire lever.
Figure 7:
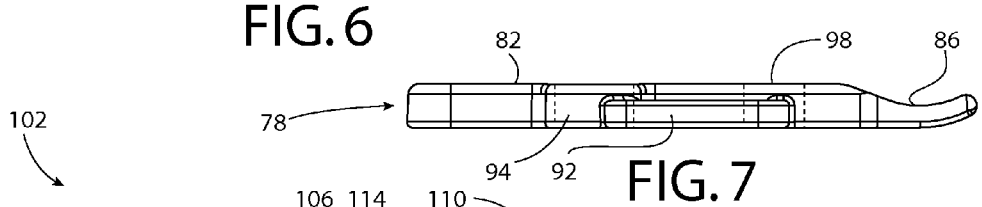
FIG. 7 is a side view of the outside bicycle tire lever from FIG. 6.

FIG. 6 is a top view of an outside tire lever 78. The tire lever 78 comprises a main body 82 and a tapered end 86. On one side of the main body is a cinch slot 90 formed by a cinch member 92. Located in the main body 82 is a compressed gas cartridge clearance hole 94 and a clearance hole 98. The compressed gas cartridge clearance hole 94 is big enough to allow the end of a compressed gas cartridge to slide in and out of the hole 94. Similarly, the clearance hole 98 is large enough to allow the shaft of a bolt to slide in and out of the hole 98. FIG. 7 is a side view of the outside tire lever 78 from FIG. 6.

Figure 8:
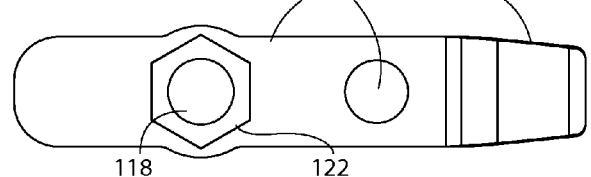
FIG. 8 is a top view of an inside bicycle tire lever.
Figure 9:
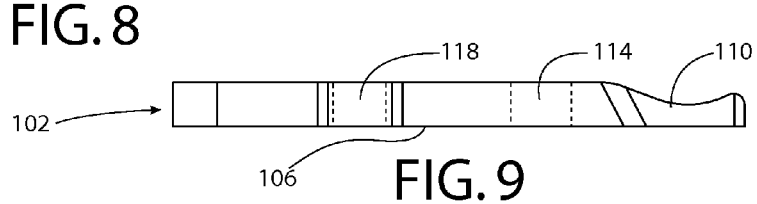
FIG. 9 is a side view of the inside bicycle tire lever from FIG. 8.

FIG. 8 is a top view of an inside tire lever 102. The tire lever 102 comprises a main body 106 and tapered end 110. Located in the main body 106 is a threaded hole 114. The threaded hole 114 is configured to allow a compressed gas cartridge to screw into the hole 114 and be held in place. The main body 106 also has a bolt clearance hole 118. The diameter of the bolt clearance hole 118 is large enough to let a suitably sized bolt shaft slide in and out of the hole 118. In one embodiment the main body 106 may have a bolt head shaped depression 122 around the perimeter of the hole 118. The depression 122 is configured to keep a bolt head from rotating once it is in the depression 122. FIG. 9 is a side view of the inside tire lever 102 from FIG. 8.

Figure 10:
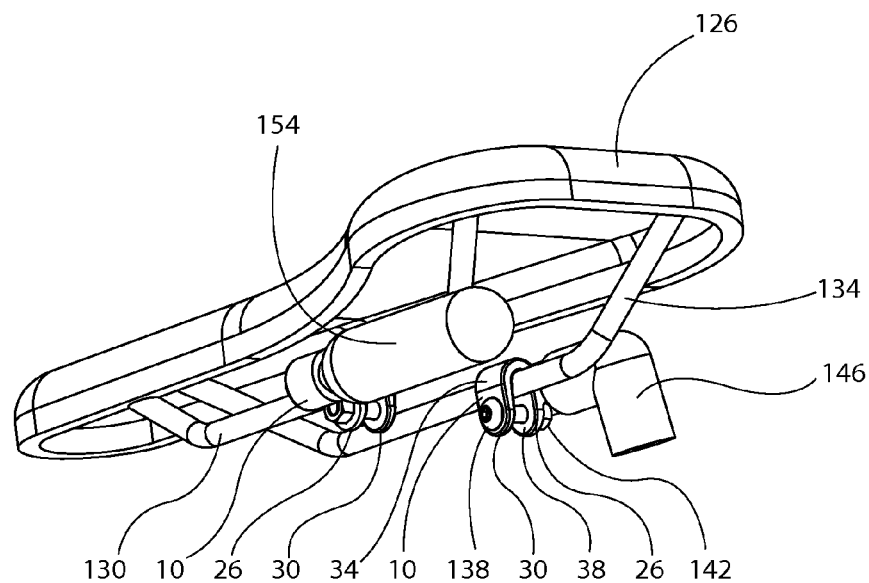
FIG. 10 is a perspective view of an underside of a bicycle seat with two compressed gas accessory holders.
Figure 11:
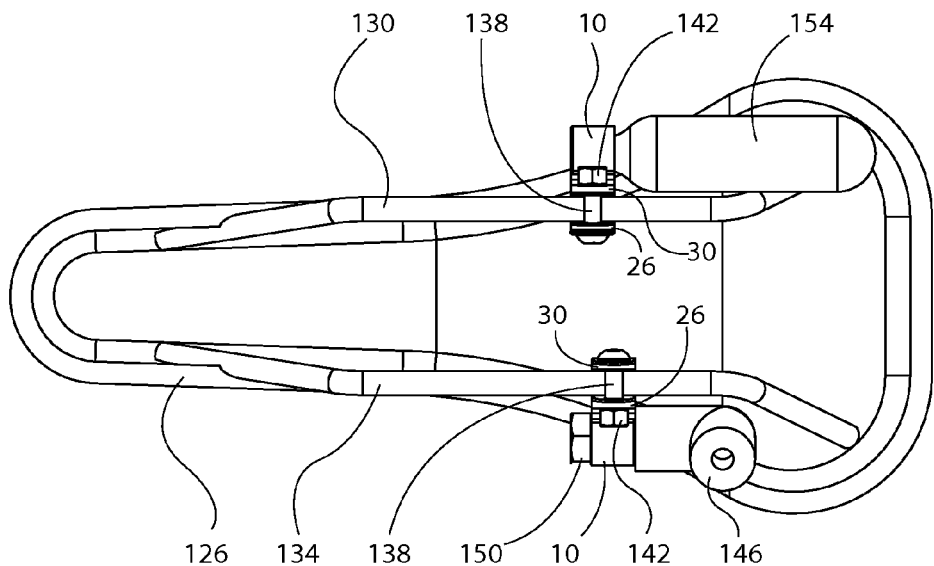
FIG. 11 is view of the underside of the bicycle seat from FIG. 10.
Figure 12:
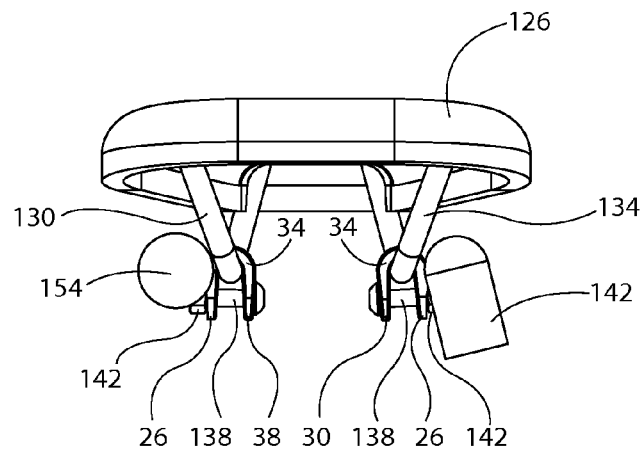
FIG. 12 is a rear view of the bicycle seat from FIG. 10.
Figure 13:
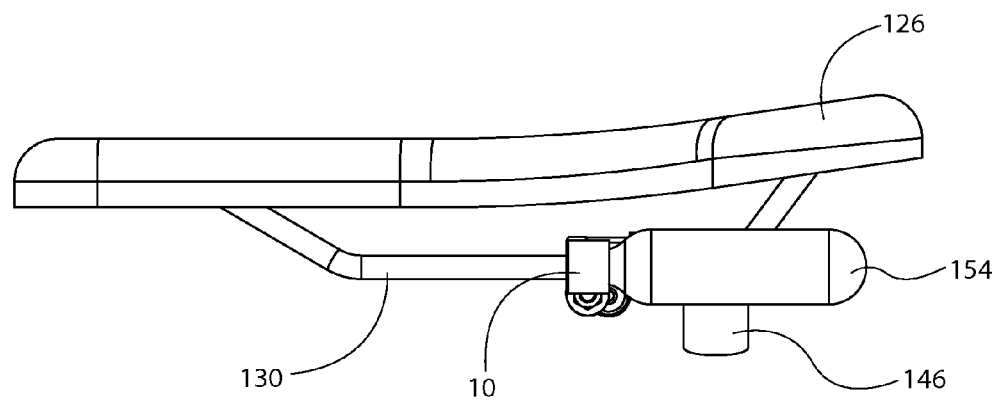
FIG. 13 is a side view of the bicycle seat from FIG. 10.

FIG. 10 is a perspective view of an underside of a bicycle seat 126 with a first rail 130 and a second rail 134. Attached to the second rail 134 is a second compressed gas accessory holder 10. The main slot 38 of the second compressed gas accessory holder is slid over the second rail 134 until the rail 134 is against the curved member 34. The first member 26 and second member 30 are tightened against the rail 130 by a screw 138 or a bolt that goes through the first screw hole 42 and second screw hole 46 and tightened with a nut 142. In another embodiment, the first member 26 and second member 30 may be tightened against the rail 130 by having the first screw hole be threaded, and passing a screw through the second screw hole 46 and tightening the screw 138 against the threads in the first screw hole 42. A compressed gas cartridge inflator 146 is attached to the main orifice 14 (not visible in this view, but visible in FIG. 11) by threading onto a bolt 150 (not visible in this view) that goes through the other side of the orifice 14 of the second compressed gas accessory holder. A first compressed gas accessory holder 10 is attached to the first rail 130. A compressed gas cartridge 154 is attached to the first 10 by screwing into the threaded inner surface 18 of the main orifice 14. FIG. 11 is view of the underside of the bicycle seat 126 from FIG. 10. FIG. 12 is a rear view of the bicycle seat 126 from FIG. 10. FIG. 13 is a side view of the bicycle seat 126 from FIG. 10.

Figure 14:
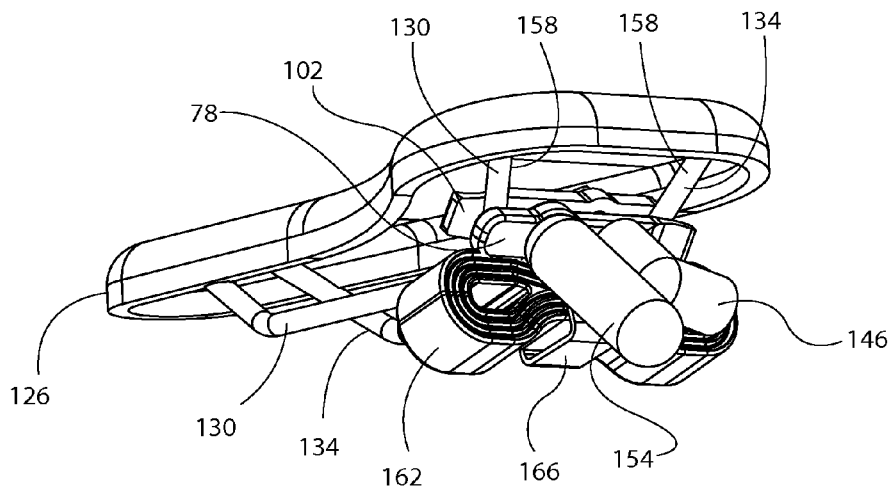
FIG. 14 is a perspective view of an underside of a bicycle seat using the bicycle tire lever system.

FIG. 14 is a perspective view of an underside of a bicycle seat 126 using the bicycle lever system. The inside tire lever 102 and outside tire lever 78 are arranged on the first rail 130 and second rail 134 such that the rails are "sandwiched" between the two levers 78, 102 as shown. In this configuration, the levers 78, 102 are removably attached to the rear facing portion 158 of the rails 130, 134. The levers 78, 102 are held in place by the compressed gas cartridge 154 sliding through the compressed gas cartridge clearance hole 94 of the outside lever 78 and screwing into the threaded hole 114 of the inside lever 102. In addition, or alternatively, the levers 78, 102 may be held in place by a bolt 150 sliding through the bolt clearance hole 118 of the inside lever and the clearance hole 98 of the outside lever 78, and having the compressed gas cartridge inflator screwed onto the bolt shaft. A spare inner tube 162 can be carried by the outside lever 78 by sliding a VELCRO cinch strap 166 through the cinch slot 90 on the outside lever 78 and wrapping the cinch strap 166 around the inner tube 162 and attaching the cinch strap to itself using a VELCRO attachment means.

Figure 15:
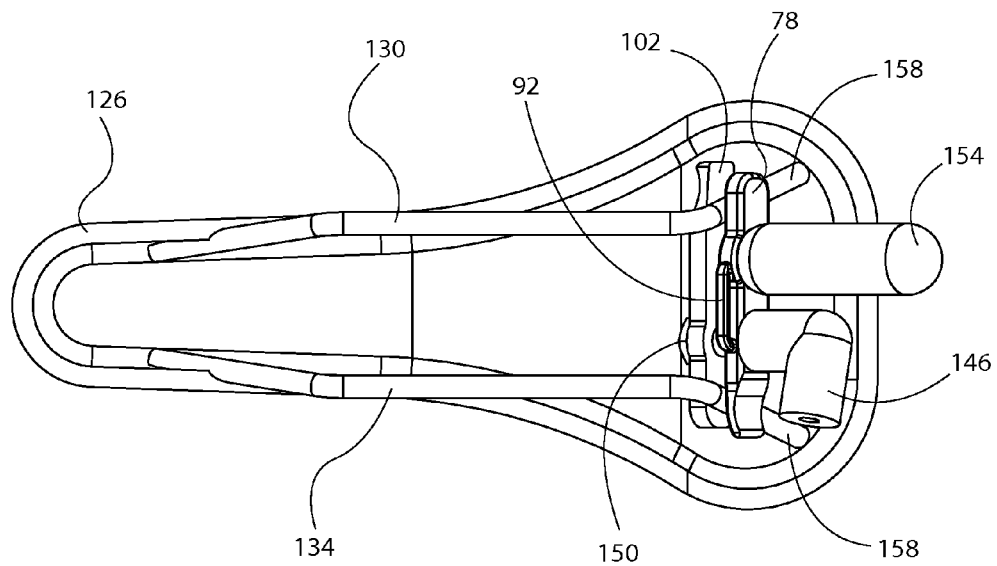
FIG. 15 is a view of the underside of the bicycle seat from FIG. 14.
Figure 16:
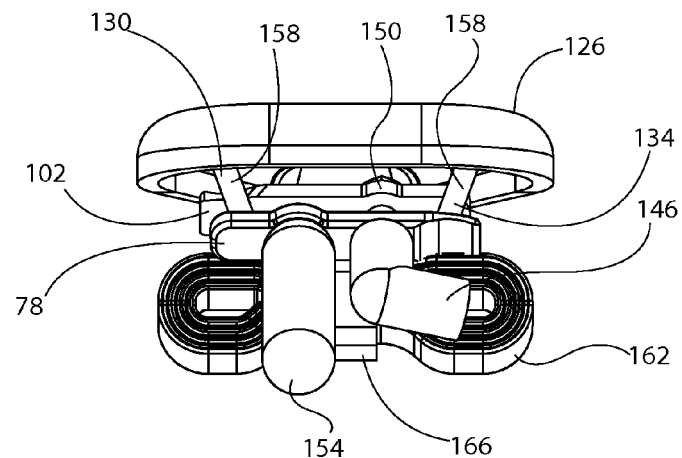
FIG. 16 is a view of the rear of the bicycle seat from FIG. 14.
Figure 17:
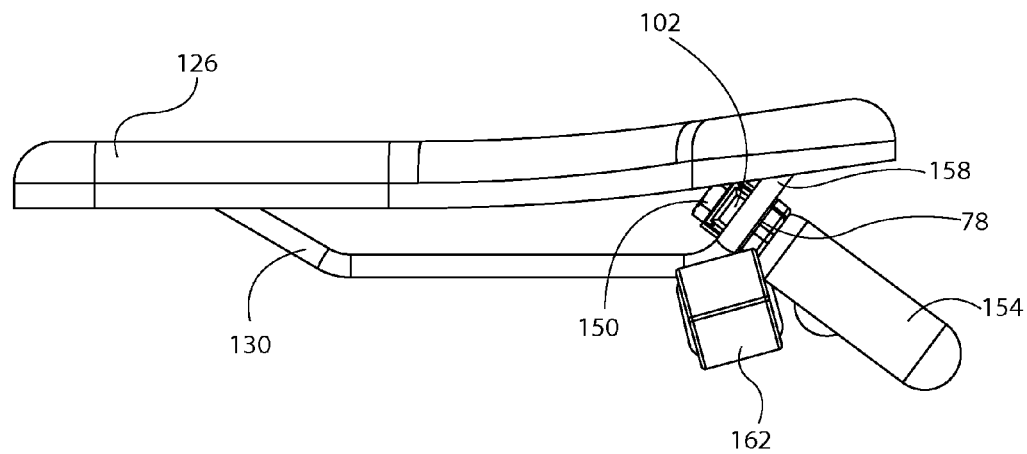
FIG. 17 is a side view of the bicycle seat from FIG. 14.

FIG. 15 is a view of the underside of the bicycle seat 126 from FIG. 14, with the cinch strap 166 and inner tube 162 removed. FIG. 16 is a view of the rear of the bicycle seat 126 from FIG. 14. FIG. 17 is a side view of the bicycle seat 126 from FIG. 14.

Figure 18:
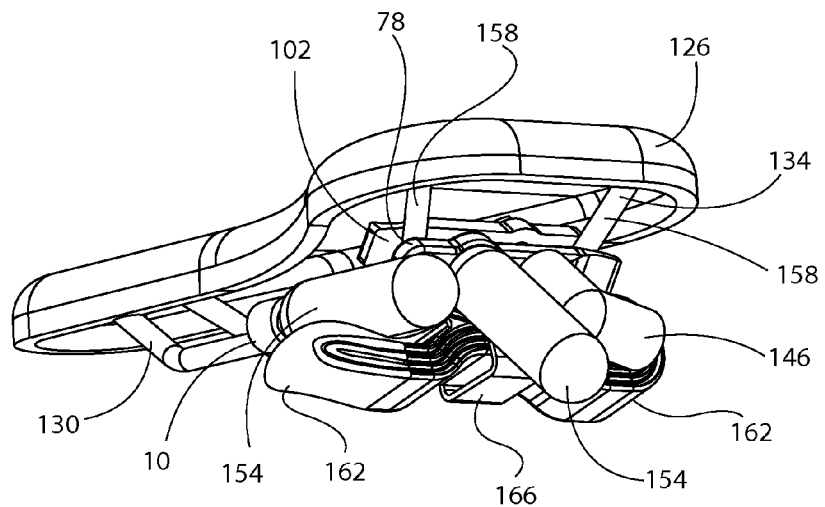
FIG. 18 is a perspective view of an underside of a bicycle seat using both the disclosed compressed gas accessory holders and bicycle levers.
Figure 19:
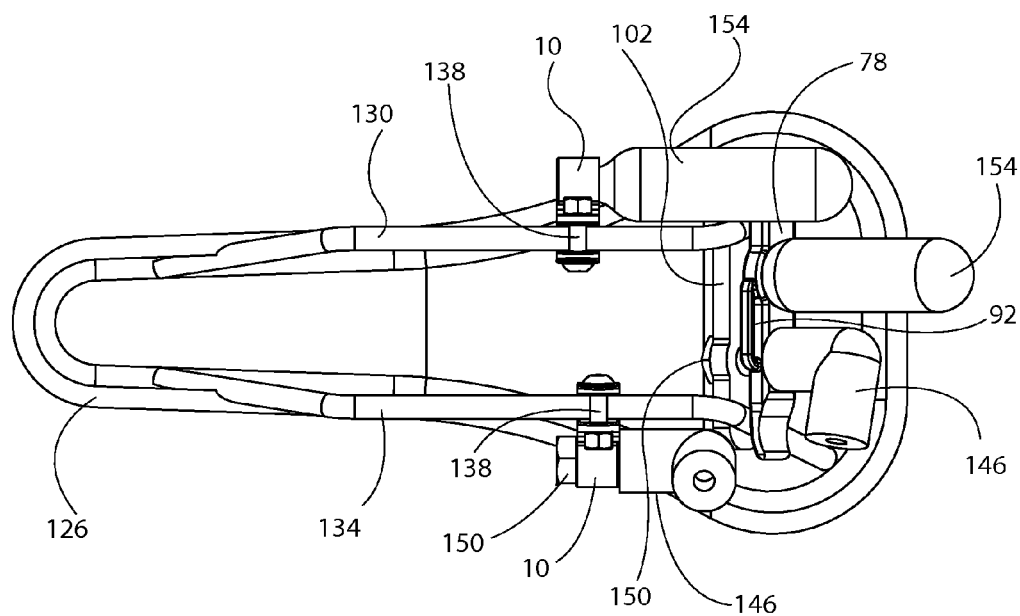
FIG. 19 is a view of the underside of the bicycle seat from FIG. 18.
Figure 20:
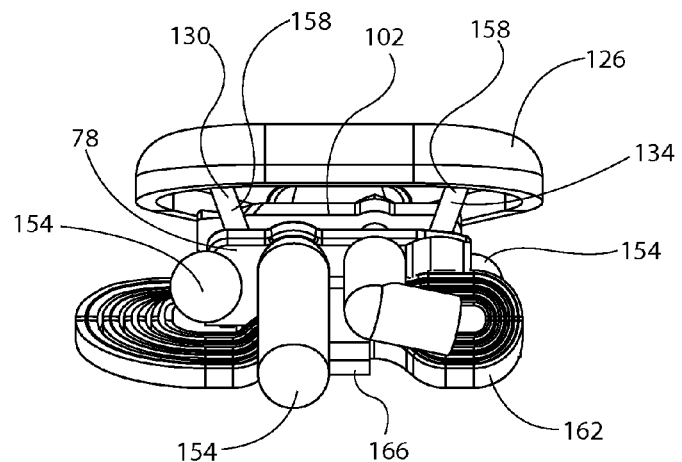
FIG. 20 is a rear view of the bicycle seat from FIG. 18.
Figure 21:
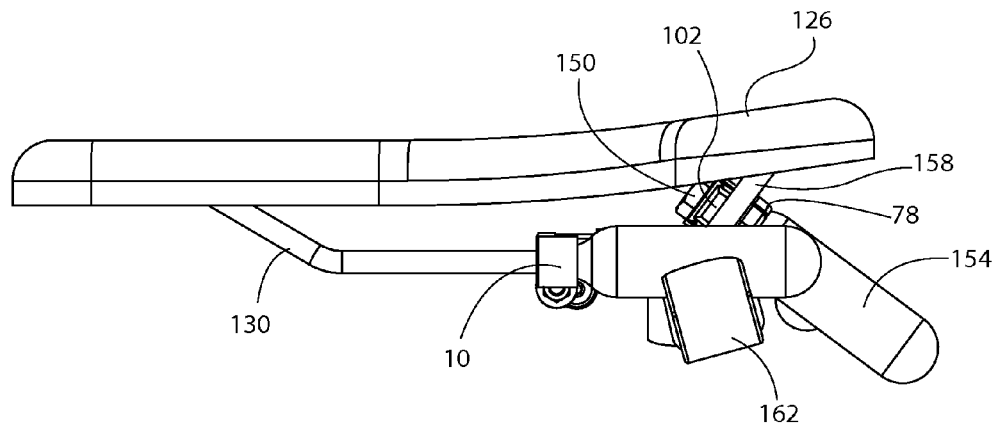
FIG. 21 is a side view of the bicycle seat from FIG. 18.

FIG. 18 is a perspective view of an underside of a bicycle seat 126 using both the disclosed compressed gas accessory holders 10 and levers 78, 102. FIG. 19 is a view of the underside of the bicycle seat 126 from FIG. 18 with the inner tube 162 and VELCRO strap cinch 166 removed. FIG. 20 is a rear view of the bicycle seat 126 from FIG. 18. FIG. 21 is a side view of the bicycle seat 126 from FIG. 18.

The disclosed bicycle repair kit provides a unique way of securing bicycle levers, compressed gas cartridges, and compressed gas cartridge inflators to the bicycle by using features of the tools themselves to mount to the bicycle. In one configuration, a tire lever is placed inside the bicycle seat rails. A second tire lever is placed outside the seat rails in a similar orientation. A compressed gas cartridge, a bolt and inflation nozzle, or a combination of singular or multiples of each can be used to clamp and secure the levers to the seat rails. The compressed gas cartridges engage pass through a clearance hole in the outer lever and engage a feature in the inner lever, such as a threaded hole or nut. The bolt is passed through clearance holes in both parts or may thread through both parts. The threads of the inflation nozzle are then screwed on to the bolt and the system is secured. A cinch strap can be added to secure an inner tube to either or both levers. In another configuration, the compressed gas accessory holder is attached to the seat rail using a clamping mechanism. The main orifice of the compressed gas accessory holder may be oriented parallel to the rail between about ⅜ inch and about 1½ inches from the rail. The compressed gas cartridge threads into the main orifice, securing the cartridge to the rails. Or, a bolt may be passed through the hole, and the compressed gas cartridge inflator is attached to the bolt. Similarly, a second hole or threaded post may be added spaced about ⅜ inch and about 1½ inches away from the previous hole to attach a compressed gas cartridge inflator. The invention may be made from 3 parts. These parts can be made from metal, plastic or a composite, such as fiberglass or carbon fiber. Each tire lever consists of a handle used to apply leverage to remove a tire and a narrow sweep feature to reach under a tire bead to remove the tire. A threaded hole is added to the inside lever to engage the threaded feature of the compressed gas cartridge. A clearance hole is added to the inside lever to allow a standard bolt to pass through. A clearance hole is added to the outside lever that aligns with the threaded hole on the inside lever to allow the compressed gas cartridge to pass through and engage the tapering neck of the cartridge. A clearance hole is added to the outside lever that aligns with the clearance hole of the inside lever to allow the bolt to pass through. The third part consists of a compressed gas accessory holder that wraps around a seat rail. The threaded hole is added to engage an extra compressed gas cartridge. A third hole is added perpendicular to the compressed gas accessory holder slots to pass a standard bolt to thread and clamp the mechanism to the seat rails.

This invention has many advantages. This invention uses fewer parts than other bicycle repair kits. The invention allows the user clear visibility of the tools and components of the bicycle repair kit and access to the same thereby easing the use. The invention weighs less than known bicycle repair kits, improving the overall cycling performance. The invention is small and more aerodynamically concealed improving the cycling performance. The invention does not require the user to carry tools on their person improving their comfort. The invention utilizes the tools themselves to mount, reducing the number of components to carry.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A pair of bicycle tire levers, the pair of bicycle tire levers comprising:
    an outside lever, the outside lever having an outside lever main body and a tapered end on one end of the outside lever main body, the outside lever comprising:
        an unthreaded compressed gas cartridge clearance hole located on the outside lever main body; and
    an inside lever, the inside lever having an inside lever main body and a tapered end on one end of the inside lever main body; the inside lever comprising:
        a threaded compressed gas cartridge hole located on the inside lever main body and configured to allow a compressed gas cartridge to screw into the hole.

2. The pair of bicycle tire levers of claim 1, wherein
    the outside lever further comprises:
        an unthreaded clearance hole also located on the outside lever main body;
    the inside lever further comprises:
        a bolt clearance hole also located on the inside lever main body.

3. The pair of bicycle tire levers of claim 2, wherein
    the bolt clearance hole located on the inside lever main body is threaded to allow a compressed gas cartridge to screw into the bolt clearance hole.

4. The pair of bicycle tire levers of claim 1, wherein the outside lever further comprises:
    a cinch slot located on the outside lever main body.

5. The pair of bicycle tire levers of claim 1, wherein the outside lever further comprises:
    a cinch member located on one side of the outside lever main body, wherein the cinch member forms a cinch slot.

6. A compressed gas accessory holder, the compressed gas accessory holder comprising:
    a main orifice body;
    a threaded main orifice located in the main orifice body, wherein the threaded main orifice is configured to allow a compressed gas cartridge to screw into the threaded main orifice;
    a slotted body attached to the main orifice body, the slotted body comprising:
        a main slot;
        a first screw hole located on the slotted body;
        a second screw hole located on the slotted body and collinear with the first screw hole; and
    wherein an imaginary line that goes though generally the center of the main slot is parallel to an imaginary line that goes through the center of the threaded main orifice, and where an imaginary line that goes through the center of the first screw hole and the center of the second screw hole is generally offset and perpendicular to the imaginary line through the center of the threaded main orifice.

7. A bicycle tire repair kit comprising:
    a pair of bicycle tire levers, the pair of bicycle tire levers comprising:
        an outside lever, the outside lever having an outside lever main body and a tapered end on one end of the outside lever main body, the outside lever comprising:
            an unthreaded compressed gas cartridge clearance hole located on the outside lever main body,
        an inside lever, the inside lever having an inside lever main body and a tapered end on one end of the inside lever main body; the inside lever comprising:
            a threaded compressed gas cartridge hole located on the inside lever main body and configured to allow a compressed gas cartridge to screw into the threaded compressed gas cartridge hole;
    a compressed gas accessory holder, the compressed gas accessory holder comprising:
        a main orifice body;
        a threaded main orifice located in the main orifice body, wherein the threaded main orifice is configured to allow a compressed gas cartridge to screw into the threaded main orifice;
        a slotted body attached to the main orifice body, the slotted body comprising:
            a main slot;

a first screw hole located on the slotted body;
a second screw hole located on the slotted body and collinear with the first screw hole; and
wherein an imaginary line that goes though generally the center of the main slot is parallel to an imaginary line that goes through the center of the threaded main orifice, and where an imaginary line that goes through the center of the first screw hole and the center of the second screw hole is generally offset and perpendicular to the imaginary line through the center of the threaded main orifice.

8. The bicycle tire repair kit of claim 7, wherein
the outside lever further comprises:
an unthreaded clearance hole also located on the outside lever main body;
the inside lever further comprises:
a bolt clearance hole also located on the inside lever main body.

9. The bicycle tire repair kit of claim 8, wherein
the bolt clearance hole located on the inside lever main body is threaded to allow a compressed gas cartridge to screw into the bolt clearance hole.

10. The bicycle tire repair kit of claim 8, further comprising:
a bolt configured such that the bolt shaft can slide through the bolt clearance hole of the inside lever and the unthreaded clearance hole on the outside lever, the bolt shaft also configured to slide through the main threaded orifice without engaging the threads of the main threaded orifice;
a compressed gas cartridge inflator configured to screw onto the bolt shaft.

11. The bicycle tire repair kit of claim 7, further comprising:
a cinch slot located on the outside lever main body;
a hook and loop cinch strap configured to slide through the cinch slot, and wrap around and hold a spare inner tube.

12. The bicycle tire repair kit of claim 7, wherein the outside lever further comprises:
a cinch member located on one side of the outside lever main body, wherein the cinch member forms a cinch slot;
a hook and loop cinch strap configured to slide through the cinch slot, and wrap around and hold a spare inner tube.

13. The bicycle tire repair kit of claim 7, further comprising:
a compressed gas cartridge configured to screw into the threaded compressed gas cartridge hole or the threaded main orifice.

* * * * *